United States Patent

[11] 3,566,035

| [72] | Inventors | A. Michael Noll<br>Newark, N.J.;<br>Manfred R. Schroeder, Gillette, N.J. |
|---|---|---|
| [21] | Appl. No. | 863,398 |
| [22] | Filed | July 17, 1969 |
| [45] | Patented | Feb. 23, 1971 |
| [73] | Assignee | Bell Telephone Laboratories, Incorporated<br>New York, N.Y.<br>Continuation of application Ser. No.<br>420,362, Dec. 22, 1964, now abandoned. |

[54] REAL TIME CEPSTRUM ANALYZER
8 Claims, 8 Drawing Figs.

[52] U.S. Cl..................................................... 179/1,
324/77
[51] Int. Cl..................................................... G10l 1/04
[50] Field of Search............................................ 179/1 (AS),
15.55; 324/77 (G)

[56] References Cited
UNITED STATES PATENTS
3,168,699  2/1965  Sunstein et al................ 324/77(G)UX

OTHER REFERENCES

Proceedings of the symposium on TIME SERIES ANALYSIS, Murray Rosenblatt, ed., CH 15., John Wiley and Sons, New York (Feb. 11, 1963).

NATURE, Article by J.S. Gill, Jan. 14, 1961, pgs. 117—119.

I.B.M. Technical Disclosure Bulletin, June, 1962, Vol. 5 No. 1, pgs. 28—30.

Primary Examiner—Kathleen H. Claffy
Assistant Examiner—Jon Bradford Leaheey
Attorneys—R. J. Guenther and William L. Keefauver ABSTRACT: The periodicity or aperiodicity of a signal is determined, in a signal analyzer, from the so-called "cepstrum" of the signal; that is, from the Fourier transform of the logarithm of the power spectrum of the signal. The short-time cepstrum is obtained by passing the signal through a first spectrum analyzer followed by a logarithmic amplifier and a second spectrum analyzer. The cepstrum signal is characterized by a peak at a time proportional to the fundamental period during periodic portions of the signal, and by the absence of a peak during aperiodic portions of the signal.

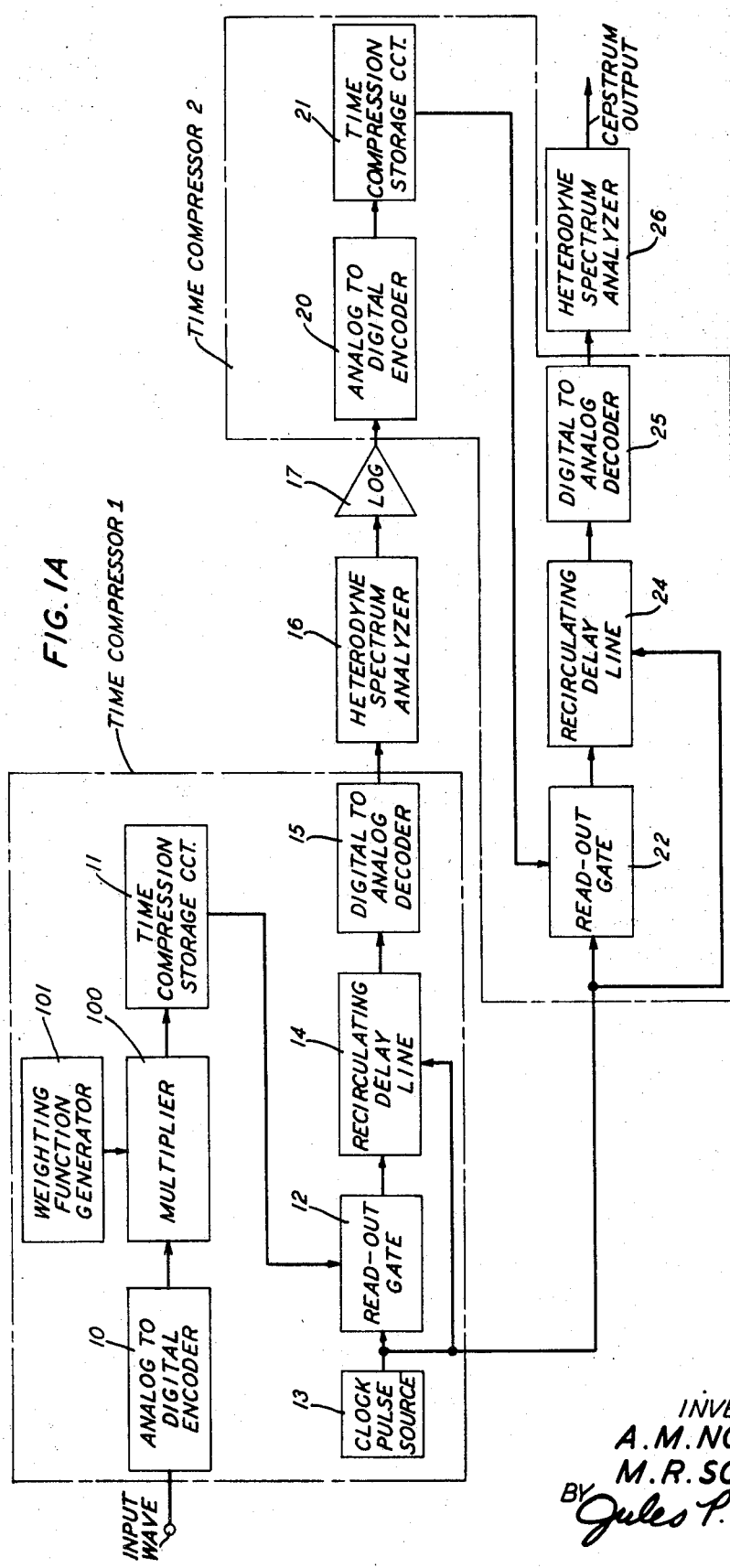

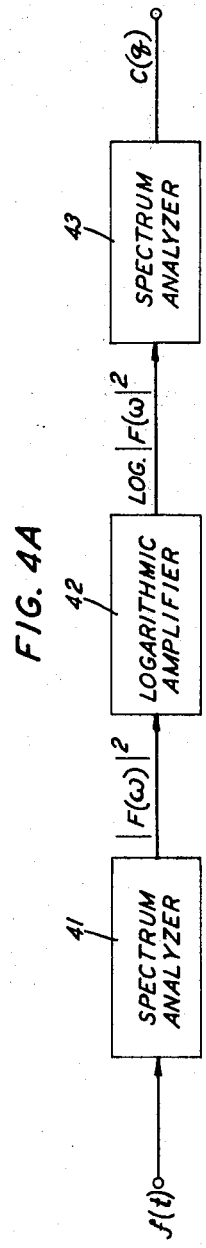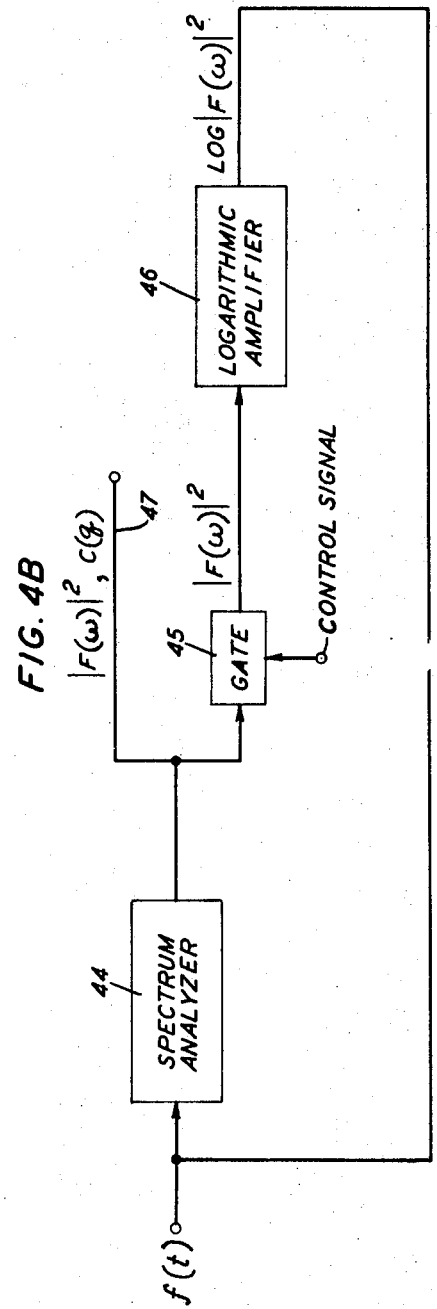

3,566,035

REAL TIME CEPSTRUM ANALYZER

This is a continuation of a copending application of A. Michael Noll and Manfred R. Schroeder, Ser. No. 420,362, filed Dec. 22, 1964, now abandoned.

This invention relates to the analysis of complex waves and in particular to apparatus for determining the periodicity and aperiodicity of complex waves.

In many situations it is necessary to determine whether a particular portion of a complex wave is periodic or aperiodic, and if it is found to be periodic, to determine the period length. For example, in so-called channel vocoder communication systems of the type described in H. W. Dudley U.S. Pat. No. 2,151,091, issued Mar. 21, 21, 1939, the frequency bandwidth required to transmit speech information is substantially reduced by transmitting in coded form selected speech characteristics. One of the most important characteristics transmitted in coded form is the so-called pitch characteristic, which specifies whether at a given instant, a speech wave is periodic, representing voice sounds, or aperiodic, representing unvoiced sounds, and, if it is periodic, the length of each period. It is especially important in vocoder systems that the pitch characteristic be determined with a high degree of accuracy, since it has been found that relatively small errors in the pitch characteristic cause the speech reconstructed from the coded signals to have an unnatural, distorted sound.

The present invention determines the periodicity and aperiodicty of a complex wave with a high degree of accuracy by performing two successive spectral analyses. The first analysis is performed upon a selected segment of a complex wave to obtain a first so-called short-time spectrum, while the second analysis is performed upon a waveform representing the logarithm of the first short-time spectrum to obtain a second short-time spectrum. The second short-time spectrum obtained in this manner is also referred to as a "cepstrum," which, as described by A. M. Noll in "Short-Time Spectrum and 'Cepstrum' Techniques for Vocal-Pitch Detection," Vol. 36 Journal of the Acoustical Society of America page 296 (1964), is simply an alternative expression for the short-time spectrum of the logarithm of a short-time spectrum.

The use of the term "cepstrum" to denote the second short-time spectrum emphasizes that the second short-time spectrum is not the inverse transform of the first short-time spectrum; rather, the second short-time spectrum is obtained by considering the logarithm of the first short-time spectrum as an independent function upon which spectral analysis can be performed. Under proper conditions, as set forth below, periodicity in the original wave segment causes aperiodic fine structure to be imposed on a coarse structure in the first short-time spectrum, and spectral analysis of the logarithm of the first short-time spectrum produces a second short-time spectrum characterized by a single large peak whose location indicates the length of the periods in the original wave segment. Correspondingly, aperiodicity in the original wave segment is accompanied by an absence of a periodic fine structure in the first short-time spectrum, and spectral analysis of the logarithm of the first short-time spectrum in this case produces a second short-time spectrum characterized by the absence of a single large peak in the range of the fundamental period.

It is often necessary to analyze more than a single segment of a complex wave in order to obtain a continuous indication of periodicity and aperiodicity, in which case the two spectral analyses of the present invention are performed upon successive segments of the complex wave. Further, there are applications where indications of periodicity and aperiodicity must be obtained in "real time," that is, except for a small fixed delay, the rate at which each second short-time spectrum is derived from each wave segment must keep pace with the rate at which the periodicity and aperiodicity of the complex wave changes. For example, in applying this invention to a vocoder communication system, the second short-time spectrum must indicate periodicity and aperiodicity at the same pace that the human voice changes the nature of its pitch characteristic. In certain real time applications of invention, it is desirable to specify a complete first short-time spectrum within a time interval shorter than the interval occupied by the corresponding wave segment. Accordingly, it is a feature of the present invention to compress in time each wave segment so that the corresponding first short-time spectrum may be completely specified within a selected relatively short time interval. Similarly, it may also be desired to specify completely each second short-time spectrum within a time interval shorter than the interval occupied by the corresponding wave, and in this case both the wave segments and the corresponding first short-time spectra are compressed in time by the desired amount. In this manner, each of the two spectral analyses may be performed as fast as the complex wave is applied, thereby to produce a second short-time spectrum for each complex wave segment at a small time after it arrives at the apparatus of this invention.

The invention will be fully understood from the following detailed description of illustrative embodiments thereof taken in connection with the appended drawings, in which:

FIG. 1A is a schematic block diagram of apparatus embodying the principles of this invention for application in a system requiring real-time determination of periodicity and aperiodicity;

Figure 2A:
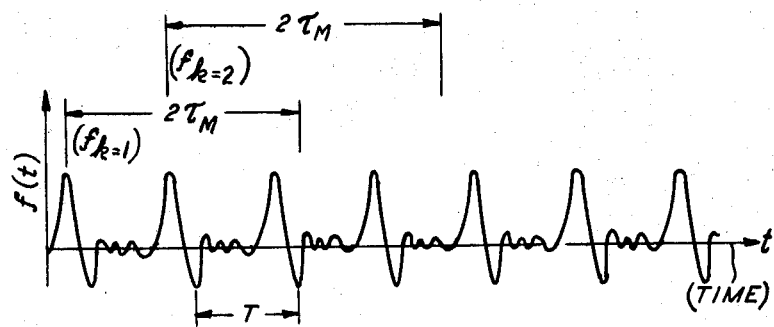
Figure 2B:
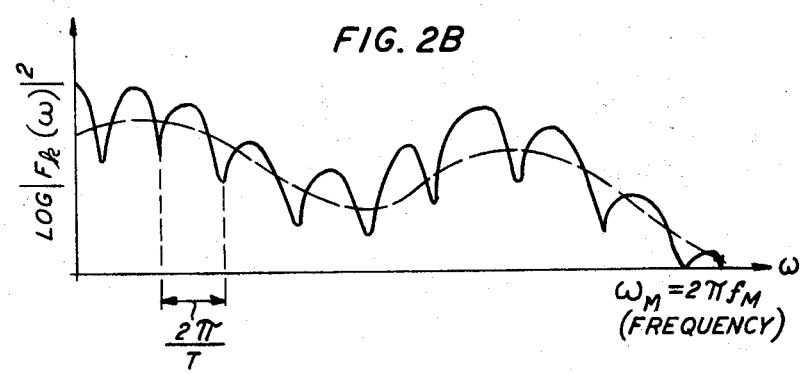
Figure 2C:
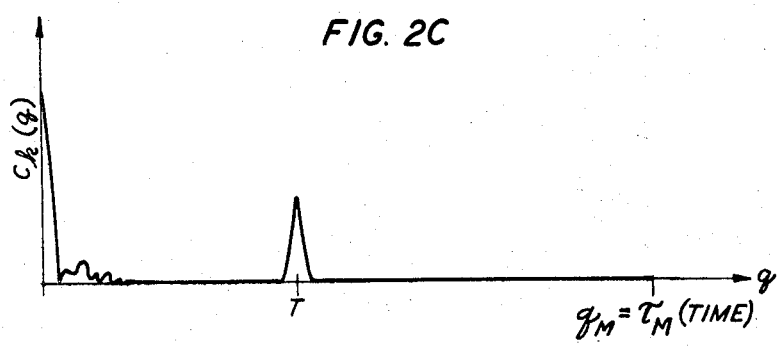
Figure 3:
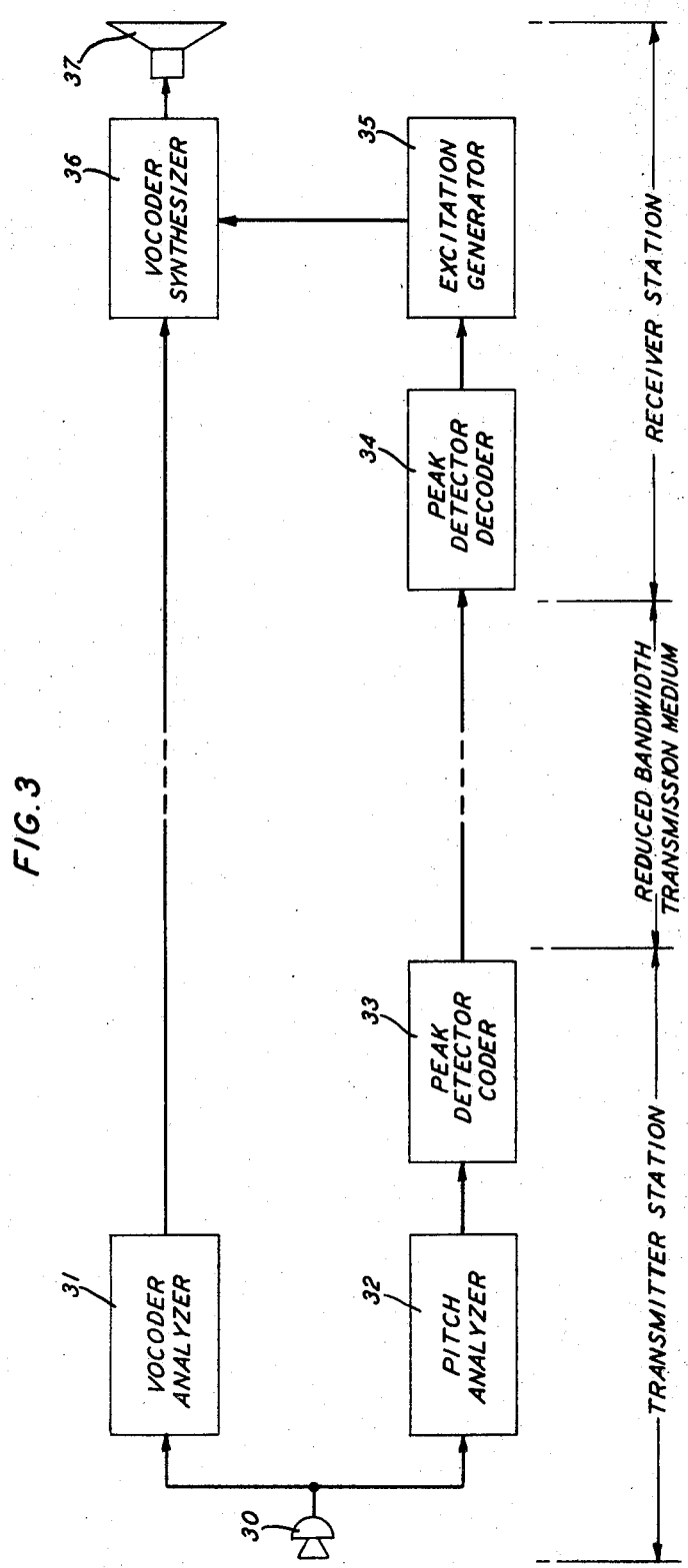

FIGS. 2A, 2B, and 2C are graphs which assist in explaining certain features of this invention;

FIG. 3 is a schematic block diagram of a vocoder communication system illustrating a specific application of the principles of this invention shown in FIG. 1A; and FIGS. 4A and 4B illustrate alternative embodiments of the general principles of this invention.

THEORETICAL CONSIDERATIONS

Turning first to FIGS. 2A, 2B, and 2C, these drawings illustrate graphically the manner in which the present invention determines the periodicity and aperiodicity of a complex wave. FIG. 2A shows several periods of an incoming time-varying complex wave $f($ $f(t)$, where the length of a single period in terms of a suitable time scale is denoted T. In order to derive the first short-time spectrum, the incoming wave is divided into successive segments $f_k(t)$, $k=1, 2$, each segment having a predetermined uniform length $2\tau_M$ containing at least two periods of $f(t)$ and here shown to be overlapping the next following segment by an amount $\tau_M$, where $2\tau_M$ and $\tau_M$ are expressed in units of time. It is to be understood that the degree of overlapping may be adjusted as required by a particular application, and that it may be dispensed with entirely if desired.

A first short-time spectrum is derived from each segment, and if desired this first short-time spectrum may be the short-time power spectrum, denoted $|F_K(\omega)|^2$, of the corresponding segment, $f_k(t)$. FIG. 2B illustrates the logarithm of the short-time power spectrum, $\log |F_k(\omega)|^2$, of the kth segment $f_k(t)$. It is observed in FIG. 2B that the logarithm spectrum has the appearance of a waveform characterized by a fine wave structure superimposed upon a coarse wave structure, that is, there is a periodic short "wavelength" variation superimposed upon a long "wavelength" variation, it being understood that the independent variable for the waveform in FIG. 2B is frequency. In the case where $f(t)$ is a speech wave, the long wavelength peaks represent formants, and the "period" of the short wavelength peaks represents the fundamental frequency, in radians, of the periodic portion of the incoming complex wave contained in the kth segment, $f_k(t)$. It is to be understood, however, that a wave segment containing an aperiodic portion of the incoming complex wave does not have a short-time spectrum with the "periodic" fine wave structure shown in FIG. 2B; in particular, the short-time spectrum of an aperiodic wave segment does not exhibit a periodic short wavelength variation.

The second short-time spectrum, denoted $C_k(q)$, which is shown in FIG. 2C, is a selected Fourier transform of $\log |F_k(\omega)|^2$, and it is observed that $C_k(q)$ also resembles a waveform in which the independent variable is time, also referred to as "quefrency." FIG. 2C illustrates $C_k(q)$ in the case of a periodic $k$th segment $f_k(t)$, in which the $C_k(q)$ waveform exhibits a single large peak located on the time scale at a "quefrency" corresponding to the period, T, of the incoming complex wave. In the event that the incoming wave is aperiodic, the $C_k(q)$ waveform is characterized by the absence of a single large peak. It is observe in FIG. 2C that there is a large peak at the origin, but this peak, which is due to the "DC component" of the logarithm waveform, is present for both periodic and aperiodic portions of the incoming wave, hence this origin peak is ignored in determining periodicity and aperiodicity from the $C_k(q)$ waveform. Hence the presence or absence of a large peak in the second short-time spectrum indicates whether a particular wave segment contains a periodic or aperiodic portion of the incoming complex wave, and when such a peak is present, its location on the time scale, as shown in FIG. 2C, indicates the exact length of the fundamental period of the wave portion being analyzed.

As explained on pages 299 and 300 of the Noll article, in order for the second short-time spectrum to indicate unambiguously periodicity and aperiodicity in the original wave, the segment being analyzed must be sufficiently long to contain at least two periods during periodic portions of the input wave, as shown in FIG. 2A. By making each segment sufficiently long to contain at least two of the longest anticipated periods in the incoming wave, the first short-time spectrum should always exhibit the periodic short wavelength variation shown in FIG. 2B during periodic portions of the input wave, and correspondingly, the second short-time spectrum should always exhibit a single large peak other than at the origin during periodic portions of the input wave. Similarly, the absence of a single large peak in the second short-time spectrum can be relied upon to indicate aperiodicity in the portion of each wave contained in the segment being analyzed when each and every segment is made sufficiently long. It is to be understood, of course, that in the situation where a relatively short wave of unknown periodicity is to be analyzed, it may be necessary to analyze the entire wave in order to minimize the possibility that the second short-time spectrum will fail to exhibit a single large peak other than at the origin because less than two periods are contained in the segments into which the wave might be divided.

Having determined the minimum segment length that will yield a second short-time spectrum that unambiguously indicates periodicity and aperiodicity, it then becomes necessary to determine the manner in which an input wave having a duration substantially longer than two periods is to be divided into such segments. On page 298 of the Noll article it is pointed out that the Fourier transform with respect to time of the short-time spectrum of a wave segment of length $2\tau_m$ seconds is approximately band-limited to $\pm(2\tau_M)^{-1}$ cycles per second. Therefore, in accordance with the Nyquist sampling theorem, the $2\tau_m$ seconds interval may be applied to a relatively long input wave by shifting the interval across the input wave in contiguous $\tau_M$ seconds steps to produce successive $2\tau_M$ seconds wave segments with $\tau_M$ seconds overlap between successive segments. Accordingly, the present invention divides an input wave into successive overlapping segments, each segment being $2\tau_M$ seconds long and overlapping both the last $\tau_M$ seconds of the next preceding segment and the first $\tau_M$ seconds of the next following segment.

Having established the minimum length of each segment to be analyzed and the manner in which the input wave is to be divided into such segments to obtain successive overlapping segments, it is necessary to determine how the first short-time spectrum of each successive segment and the corresponding second short-time spectrum of each first short-time spectrum are to be represented. In the present invention, the first short-time spectrum is specified by a first predetermined number of samples at a corresponding number of selected frequencies, while the second short-time spectrum is specified by a second predetermined number of samples at a corresponding number of selected "quefrencies" or time instants. Determination of the exact number of samples of each spectrum is explained in the Appendix below.

APPARATUS

Referring first to FIG. 4A, this drawing illustrates apparatus embodying the general principles of the present invention. An incoming time varying signal, denoted $f(t)$, is assumed to have a relatively short duration but which is sufficiently long to include at least two periods if $f(t)$ is periodic. This signal is applied to the input terminal of a first spectrum analyzer 41 which may be of any desired variety. For example, analyzer 41 may be a conventional heterodyne spectrum analyzer of the type described by K. Koenig, H. K. Dunn, and L. Y. Lacy in "Sound Spectrograph," Vol. 18, Journal of the Acoustical Society of America page 19 (947), in which there is derived a first short-time spectrum signal representative of the short-time power spectrum, denoted $|F(\omega)|^2$, of $f(t)$. The short-time spectrum output signal of analyzer 41 is delivered to a logarithmic amplifier 42, which may be of any well known design, thereby to develop at the output terminal of amplifier 42 a logarithmic wave that represents the logarithm of the first short-time spectrum signal from analyzer 41; that is, the logarithmic wave developed by amplifier 42 represents $\log |F(\omega)|^2$, or the logarithm of the short-time power spectrum of the incoming signal $f(t)$.

From amplifier 42 the logarithmic wave is passed to spectrum analyzer 43, which may be identical in construction with analyzer 41, to derive a second short-time spectrum signal that is proportionate to a predetermined short-time Fourier transform, denoted $C(q)$, of the logarithm of the short-time power spectrum of $f(t)$. As pointed out in the Appendix below, the second short-time spectrum signal may be proportionate to either the square of the short-time Fourier sine or cosine transform of $\log |F(\omega)|^2$ or the sum of the squares of the short-time Fourier sine transform and short-time Fourier cosine transform of $\log |F(\omega)|^2$, where $F(\omega)$ is defined to be zero for $\omega$ negative. By appropriately proportioning the length of that portion of $f(t)$, to be analyzed to include at least two of the longest periods that are anticipated in periodic portions of $f(t)$, the presence or absence of a single large peak other than at the origin in $C(q)$ will indicate without ambiguity periodicity or a periodicity in $(f)(t)$.

If desired, a single spectrum analyzer may be employed to derive the two successive spectrum signals in the manner shown in FIG. 4B. An incoming signal, $(f)(t)$, is applied to spectrum analyzer 44 to derive a first short-time spectrum signal representative of the short-time power spectrum, $|F(\omega)|^2$. This first short-time spectrum signal, which appears on output lead 47, is delivered to the input terminal of transmission gate 45. Gate 45 is enabled by an appropriate control signal to pass the first short-time spectrum signal developed by analyzer 44 to logarithmic amplifier 46. Amplifier 46 develops a logarithmic wave that represents the logarithm of the first short-time spectrum signal, and this logarithm wave is passed to the input terminal of analyzer 44 by way of switch S1 in order to obtain a second short-time spectrum signal, denoted $C(q)$, which is proportionate to a predetermined short-time Fourier transform of the logarithm of $|F(\omega)|^2$. By appropriately timing the control signal to enable gate 45 only during the time that the first short-time spectrum signal is being developed by analyzer 44, and by appropriately operating switch S1, there will appear successively on lead 47 the first short-time spectrum signal followed by the second short-time spectrum signal.

It will be obvious to those skilled in the art that the apparatus shown in FIGS. 4A and 4B may be further refined and elaborated by the addition of other equipment such as automatic timing and recording devices. For example, it may be desired to make permanent records of the two short-time spectrum signals, either sequentially or individually.

Referring now to FIG. 1A, this drawing illustrates apparatus for continuously determining the periodicity and aperiodicity of a relatively long wave in real time. An input wave to be analyzed is first applied to a time compressor 1 so that the wave may be sufficiently compressed in time to enable the first short-time spectrum signal to be obtained rapidly by analyzer 16, since in a typical heterodyne analyzer a significant time interval is required to obtain each spectrum value. Within compressor 1, analog-to-digital encoder 10 converts the analogue waveform into digital pulses. Encoder 10 may be of any conventional construction, for example, see the article by H. G. Cooper, M. H. Crowell, and C. Maggs entitled "A High-Speed PCM Coding Tube," Volume 42, Bell Laboratories Record, page 267 (1964). Specifically, encoder 10 samples the incoming wave at a rate that is at least twice the highest frequency component of the wave to produce a succession of uniformly spaced samples whose amplitudes are proportional to amplitudes of the wave at the sampling instants. Encoder 10 also converts each sample into a code group of $n$ serial pulses that represents numerically that one of a number of predetermined amplitude levels nearest the amplitude of the sample. The number of pulses contained in each code group depends upon the number system being employed and accuracy with which each sample is to be represented; for instance, the binary number system is widely used in the coding of signal amplitudes by means of pulses.

From encoder 10 the $n$-pulse code groups are passed through a digital multiplier 100 which is also supplied with a weighting signal from weighting function generator 101. By this arrangement, each $n$-pulse code group is weighted by a predetermined amount in order to control the resolution and smoothness of the first short-time spectrum. Examples of suitable weighting functions are described by R. B. Blackman and J. W. Tukey in "Measurement of Power Spectra from the Point of View of Communications," Volume 37, pages 185, 485 (1958).

The weighted $n$-pulse code groups from multiplier 100 are passed to time compression storage circuit 11, which may be of the type described in V. C. Anderson, U.S. Pat. No. 2,958,039, issued Oct. 25, 1960 and in J. P. Hesler and W. Peil U.S. Pat. Nos. 3,144,638, and issued Aug. 11, 1964. Circuit 11 compresses a selected number of weighted code groups into a relatively small time interval of predetermined size by recirculating each incoming weighted code group through a delay storage element having a delay time selected to be shorter than the interval between successive incoming weighted code groups. The selected amount of time by which the delay time is shorter than the original interval between successive code groups becomes the new shortened interval between successive code groups. This is produced by the action of circuit 11 in that a code group that has passed through the storage element for the first time is caused to reenter the storage element by this selected amount of time ahead of the next succeeding code group which is being admitted to the storage element for the very first time. By repeating this recirculation through the storage element of previously admitted code groups ahead of each newly admitted code group, there is eventually accumulated within circuit 11 a succession of recirculating code groups occupying a total compressed time interval which is equal to the delay time of the storage element and which is substantially smaller than the original real time interval occupied by the recirculating code groups. When the number of recirculating code groups reaches the maximum that can be accommodated by the storage element, the oldest code group is erased to make way for a new weighted code group.

Since circuit 11 performs time compression by inserting the recirculating code groups into the storage element ahead of each new weighted code group, it is necessary to construct encoder 10 so that each code group occupies a sufficiently small portion of each sampling interval to permit the desired number of recirculating code groups in circuit 11 to be inserted without interference into the storage element ahead of each new incoming weighted code group.

The output terminal of circuit 11 is connected to a readout gate 12 which is enabled by regularly generated clock pulses from clock pulse source 13. The clock pulses have a uniform duration equal to the compressed time interval occupied by $N_1$ of the code groups in circuit 11, where $N_1$ code groups represent a $2\tau_M$ seconds segment of the input wave, and where $N_1$ is a selected positive integer. Also, the repetition rate of source 13 is selected so that the interval between successive clock pulses is $\tau_M$ seconds, or one-half the length of each $2\tau_M$ seconds segment, thereby producing an overlap of $\tau_M$ seconds between successive $2\tau_M$ segments. It is apparent that other amounts of overlap can be obtained by appropriately adjusting the repetition a rate of source 13, and FIG. 1B, which is described in detail below, illustrates an alternative arrangement in which clock pulse source 13 may be eliminated entirely. By this arrangement, the first half of the $N_1$ time compressed code groups passed from circuit 11 to delay line 14 during the enabled condition of gate 12 also forms the last half of the preceding sequence of time compressed code groups passed to delay line 14, since in the $\tau_M$ seconds interval between successive clock pulses only the first half of the preceding sequence of $N_1$ coded groups has been erased in circuit 11, the second half remaining in recirculation within circuit 11. Hence except for the first sequence of time compressed code groups representing only the first $\tau_M$ seconds of the input wave, the $N_1$ time compressed code groups passed to delay line 14 represent overlapping $2\tau_M$ seconds segments of the input wave, the amount of overlap being $\tau_M$ seconds as specified above.

Recirculating delay line 14 is a so-called dynamic register in which each incoming sequence of time compressed code groups is delayed by a predetermined amount and then returned from the output point of element 14 to its input point. In this manner, the sequence of $N_1$ code groups continues to circulate around a closed path until the next sequence of $N_1$ time compressed code groups is passed from circuit 11 to delay line 14, at which time the clock pulse from source 13 causes the prior sequence of $N_1$ code groups to be erased. For a discussion of recirculating delay line devices see J. Millman and H. Taub, "Pulse and Digital Circuits," page 413 (1956), and A. H. Meitzler, "Ultrasonic Delay Lines Used to Store Digital Data," Volume 42, Bell Laboratories Record, page 315 (1964), Recirculating delay line 14 therefore serves to hold each sequence of $N_1$ code groups for a predetermined time interval. This predetermined time interval is chosen to be equal to the length of time required to obtain the desired number of samples of the short-time spectrum of the wave segment represented by the $N_1$ code groups.

The output point of delay line 14 is also connected to a digital-to-analog decoder 15 so that each sequence of $N_1$ time compressed code groups is converted into a corresponding sequence of $N_1$ time compressed analogue replicas of a $2\tau_M$ seconds segment of the original input wave. Therefore, the output signal of time compressor 1 consists of successive sequences of $N_1$ time compressed replicas, with each sequence of $N_1$ time compressed replicas representing a $2\tau_M$ seconds segment of the incoming wave which overlaps $\tau_M$ seconds of the segment represented by the next following sequence of $N_1$ time compressed replicas. Further, each sequence of $N_1$ time compressed replicas occupies a time interval of $\tau_M$ seconds.

The succession of $N_1$ time compressed analogue wave segments from decoder 15 is passed to a conventional heterodyne spectrum analyzer, that is, a spectrum analyzer in which the signal to be analyzed is mixed with the variable frequency output signal of a tunable oscillator. From the mixed signal there is obtained a selected sum or difference frequency signal by passing the mixed signal through a fixed band-pass filter. As required by the definition of the Fourier transform, the output signal from the fixed band-pass filter is integrated over the duration of the wave segment being analyzed. The value of this integral at the end of the wave segment is proportional to the amplitude of that frequency component of the wave segment corresponding to the average frequency of the tunable oscillator during the duration of the wave segment. To obtain a representation of a complete spectrum, the signal to be analyzed is repeatedly reproduced, each reproduction of the signal being mixed with a different frequency output signal of the tunable oscillator. Thus in the present invention each repetition of the time compressed wave segment is mixed with a different predetermined frequency from a tunable oscillator within analyzer 16, filtered, and then integrated, to obtain at the output terminal of analyzer 16 a sample value of the short-time spectrum of the input wave segment at a different spectral frequency. The series of samples are then filtered again to yield a signal representing the amplitude spectrum of the waveform segment being analyzed.

It is evident from the operation of the above-described portion of the apparatus of this invention the that the desired number of sample values of the short-time spectrum determines the number of times, denoted $k_1$, that each sequence of time compressed code groups is to be recirculated within delay line 14 in the interval $\tau_M$ seconds before the next sequence of time compressed code groups is passed from circuit 11 to delay line 14. Accordingly, delay line 14 is constructed to have a delay time that will enable each sequence of $N_1$ time compressed code groups gated from circuit 11 to be recirculated $k_1$ times during the $\tau_M$ seconds interval between successive clock pulses to obtain at the output terminal of analyzer 16 a corresponding number of successive samples of the short-time spectrum which will completely specify each short-time spectrum of each input wave segment. It is further evident that the desired number of spectrum sample values also determines the compressed time interval to be occupied by the sequence of $N_1$ code groups. Thus in order for $k\,1$ spectrum sample values to be obtained in each $\tau_M$ seconds interval between clock pulses, each sequence of $N_1$ code groups must be compressed into an interval no greater than $\dfrac{\tau_M}{k_1}$ seconds so that each sequence of $N_1$ time compressed code groups may be repeated $k_1$ times within each $\tau_M$ seconds interval.

The analogue signal derived from the train of $k_1$ short-time spectrum samples produced by analyzer 16 during each $\tau_M$ seconds interval is passed through a conventional logarithmic amplifier to obtain a logarithm waveform representing the logarithm of each short-time spectrum, and this logarithm spectrum waveform is then applied to a second time compressor 2 which compresses each logarithm waveform to reduce the time required to perform the second spectral analysis. Within compressor 2, and analog-to-digital encoder 20 is followed in series by time compression storage circuit 21, readout gate 22, recirculating delay line 24, digital-to-analog decoder 25, and heterodyne spectrum analyzer 26. Elements 20, 21, 22, 24, 25 and 26, which may be identical in construction with the respective preceding elements 10, 11, 12, 14, 15, and 16, operate in the same fashion as the respective preceding elements to obtain a predetermined number of samples representing values of the cepstrum, or the short-time spectrum of each logarithm spectrum waveform. However, it is important to point out that although it is desirable to perform the first spectral analysis upon the input wave in successive overlapping steps because of the time varying character of the wave, this reason is not applicable in the analysis of the logarithm waveform because by definition each logarithm waveform represents a complete short-time spectrum hence each logarithm waveform is discontinuous with respect to the next succeeding logarithm waveform. In effect, the second analyzer 26 is locked in step with the first analyzer 16 as the latter analyzes successive overlapping segments of the input wave. Accordingly, each logarithm waveform in its entirety is first compressed in time by compressor 2 and then analyzed by analyzer 26.

Within compressor 2, encoder 20 converts each logarithm waveform into a sequence of $N_2$ code groups, where $N_2$ is a selected positive integer, and time compression storage circuit 21 compresses these $N_2$ code groups into a suitably small time interval. A clock pulse from source 13 enables gate 22 to pass these $N_2$ time compressed code groups to recirculating delay line 24, and delay line 24 recirculates the $N_2$ code groups for a desired number of times, denoted $k_2$, in each $\tau_M$ seconds interval between clock pulses. Decoder 25 converts each sequence of $N_2$ code groups into a time compressed replica of the original logarithm waveform, so that in each $\tau_M$ seconds interval compressor 2 generates $k_2$ time compressed replicas of each logarithm waveform. As in the case of the first spectral analysis, $k_2$ is determined by the number of desired values of the second short-time spectrum, and $N_2$ is determined by the number of samples necessary to describe the logarithm waveform with the desired degree of accuracy. Also, delay line 24 is controlled to erase each sequence of time compressed code groups at the end of each $\tau_M$ seconds interval.

The output signal produced by analyzer 26 from the $k_2$ logarithm waveform replicas comprises a train of $k_2$ sample values of a second short-time spectrum which is a selected short-time Fourier transform of the logarithm of the first short-time spectrum derived by analyzer 16. If desired, the train of sample values from analyzer 26 may be converted into a waveform by passing them through a suitable filter, and the waveform thus obtained indicates periodicity or aperiodicity in the corresponding input wave segment by the respective presence or absence of a large peak of the type shown in FIG. 2C.

Figure 1B:
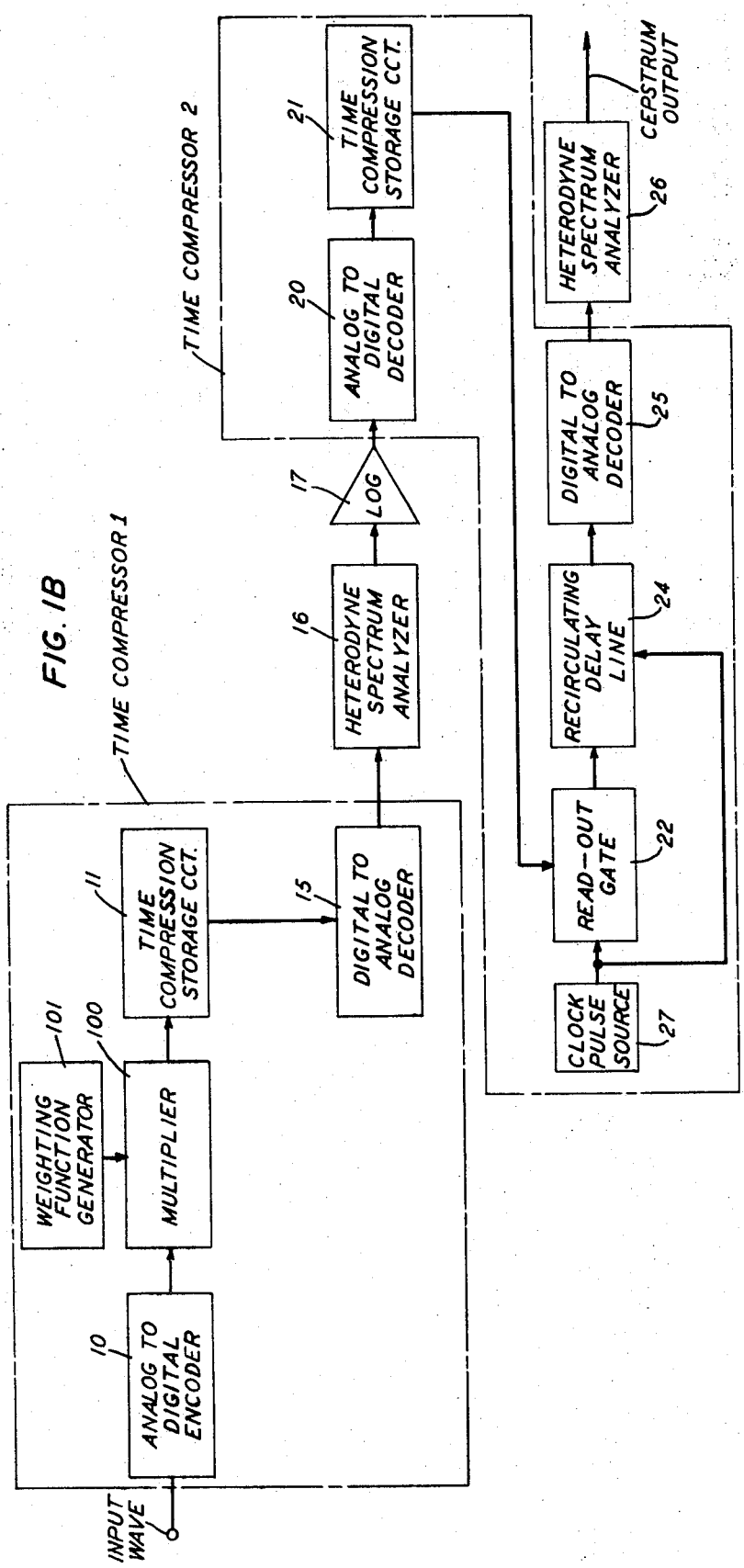
FIG. 1B is an alternative embodiment to that shown in FIG. 1A.

Turning now to FIG. 1B, this drawing illustrates apparatus in which the time compressed wave segments are not held fixed in time within time compressor 1 while the first spectral analysis is being performed. Instead, in time compressor 1 the time compressed code groups are passed continuously and directly from circuit 11 to analyzer 16 via decoder 15 so that the succession of spectrum samples developed by analyzer 16 are derived from a succession of slightly different time compressed wave replicas. Within time compressor 2 the succession of spectrum samples developed by analyzer 16 is grouped together to form individual first short-time spectra by the action of clock pulse source 27 in enabling gate 22 to pass groups of time compressed spectral samples from circuit 21 to delay line 24. For example, source 27 is selected to have a repetition rate that permits each group of spectral samples passed to delay line 24 to represent the complete range of frequencies analyzed by analyzer 16.

UTILIZATION APPARATUS

An example of the manner in which the principles of this invention may be utilized is shown in FIG. 3, which illustrates a vocoder communication system constructed to employ an embodiment of the principles of the present invention in order to determine the pitch characteristic of an incoming speech wave prior to coding. An incoming speech sound wave at a transmitter station is converted by transducer 30 into a facsimile electrical wave which is delivered simultaneously to vocoder analyzer 31 and a so-called pitch analyzer 32. Analyzer 31 which may be a conventional channel vocoder analyzer of the type shown in H. W. Dudley U.S. Pat. No. 2,151,091, issued March 21, 1939, derives from the speech wave a group of narrow band channel control signals representing in coded form the energy within each of a number of selected frequency subbands of the wave. Pitch analyzer 32, which comprises apparatus of the type shown in FIG. 1A, derives a succession of output waveforms for each corresponding succession of overlapping segments of the incoming speech wave, each output waveform indicating periodicity or aperiodicity in the corresponding segment by the presence or absence of a single large peak. Peak detector coder 33 following analyzer 32 derives from the successive output waveforms generated by analyzer 32 a coded pitch control signal indicative of the presence or absence of a single large peak in the successive cepstrum waveforms, and if a peak is present, the pitch control signal also indicates the relative location of each peak on the time scale. A suitable peak detector coder is described in H. S. McDonald U.S. Pat. No. 3,109,142 issued Oct. 29, 1963.

The control signals from analyzer 31 and peak detector coder 33 are transmitted over a reduced bandwidth transmission channel to a receiver station, where a peak detector decoder 34 followed by an excitation generator 35 cooperate to generate a suitable excitation signal from the coded pitch control signal. Both decoder 34 and generator 35 are described in the above-mentioned McDonald patent. Vocoder synthesizer 36, which is shown in the Dudley patent, reconstructs a replica of the original speech wave from the transmitted channel control signals and the excitation signal from generator 35. Reproducer 37, which may be a conventional loudspeaker, converts the replica speech wave into audible sound.

NUMERICAL EXAMPLE

It is believed that a numerical example will aid in understanding the operation of the FIG. 1A embodiment of the present invention by specifying the exact intervals and repetition rates required for a particular input wave which is to be analyzed. A typical example of an input wave is a speech wave band-limited to 4,000 cycles per second and characterized by fundamental pitch periods having a maximum anticipated duration or 20 milliseconds, corresponding to a fundamental pitch frequency as low as 50 cycles per second. For such a wave encoder 10 may be constructed to sample the input wave at a rate of 10 kilocycles, and each sample may be represented by $n = 4$ on-off pulses representing 4 binary digits or bits. Encoder 10 therefore produces a 4 pulse code group within each 0.1 milliseconds sampling interval; the portion of each 0.1 millisecond interval to be occupied by each 4 pulse code group is determined in the following manner.

With a maximum anticipated period of $\tau_M = 20$ milliseconds, the segments into which the input wave is to be divided are $2\tau_M = 40$ milliseconds in duration; hence the number of 4 pulse code groups representing a $2\tau_M$ seconds segment of the input wave is $$N_1 = \frac{40}{0.1} = 400$$

. Further, the amount of overlap between successive segments is $\tau_M = 20$ milliseconds; hence source 13 is constructed to generate a clock pulse every 20 milliseconds, thereby passing to delay line 14, $N_1 = 400$ time compressed code groups every 20 milliseconds. In order to analyze each time compressed sequence of $N_1$ code groups in the 20 millisecond interval between successive clock pulses, it is necessary to repeat each sequence $k_1$ times within the 20 milliseconds, where $k_1$ is the desired number of spectrum sample values. As shown in the Appendix below, it has been determined that the short-time spectrum of a 40 millisecond wave segment band-limited to 4,000 cycles per second is adequately specified by approximately $k_1 = 320$ samples, but to make the numerical example easier to follow, it will be assumed that each short-time spectrum will be represented by $k_1 = 400$ samples. Since it is necessary to repeat each sequence of $N_1$ code groups 400 times in order to obtain 400 spectrum samples, this means that $N_1$ pulse code groups must be sufficiently compressed in time so that they may be recirculated $k_1 = 400$ times in delay line 14 during each $\tau_M = 20$ millisecond interval between successive clock pulses. Hence $N_1 = 400$ pulse code groups must be compressed into a $$\frac{20}{400} \text{ millisecond} = 50 \text{ microsecond interval.}$$

. This also means that the portion of each 0.1 millisecond sampling interval to be occupied by each 4 pulse code group must be sufficiently small so that time compression storage circuit 11 can fit $N_1 = 400$ such groups into a 50 microsecond interval; that is, each code group generated by encoder 10 must not occupy more than $$\frac{50}{400} = 0.125 \text{ microseconds}$$

of each 0.1 millisecond sampling interval so that 400 such 4 pulse code groups may be compressed into a single 50 microsecond interval; for example 0.10 microseconds is a suitable interval for each code group.

From the numerical specifications given above, the characteristics of circuit 11 and delay line 14 may be calculated. As mentioned previously, the delay time of the storage element in circuit 11 is designed so that a code group that has passed through the storage element for the first time reenters the storage element at a selected time spacing prior to the first admission of the next succeeding code group. For a pulse group duration of 0.10 microseconds, this means that there is an original spacing of 99.90 microseconds between successive pulse groups from encoder 10; hence the delay time of the storage element may be shorter than 99.90 microseconds by a selected time interval which is to be the new spacing between the time compressed code groups when they leave circuit 11. Since 400 code groups occupy $400 \times 0.10 = 40$ microseconds, there remains 10 microseconds of the maximum permitted 50 microseconds to be divided among 400 time compressed code groups as spacing, that is, $$\frac{10}{400} = 0.025 \text{ microseconds}$$

microseconds is available for spacing between successive time compressed code groups. Hence the delay time of the storage element is $99.90 - 0.025 = 99.875$ microseconds.

An example of a storage element having a delay time of this magnitude is described as model SM-40, "Serial Memory Pac" in catalog H-2 of the Computer Control Company, (1962). In this example it is evident that more than 400 code groups may be recirculating in circuit 11 at any given instant, since the available interval of 99.90 microseconds between incoming code groups exceeds the required 50 microseconds; specifically $$\frac{99.90}{0.10 + 0.025} = 799$$

time compressed code groups may be accommodated within circuit 11. It is also evident that because of the requirement that $N_1$ time compressed code groups be repeated 400 times in 20 milliseconds, no additional requirement need be imposed on the interval occupied by each code group generated by encoder 10 within each sampling interval in order for circuit 11 to accommodate $N_1$ code groups within a single sampling interval.

Correspondingly, delay line 14 must be have a delay time sufficiently short so that each sequence of 400 code groups occupying a 50 microsecond interval may be recirculated 400 times during the 20 millisecond interval between clock pulses. Thus by making the delay time of delay line 14 equal to the time interval occupied by the 400 time compressed code groups, that is 50 microseconds, the entire sequence of 400 time compressed code groups will be passed to decoder 15 and thence to analyzer 16 every 50 microseconds, and therefore each entire sequence of 400 code groups will have recirculated 400 times in the 20 millisecond interval between successive clock pulses.

It is apparent that the considerations described above are equally applicable to the construction of time compression storage circuit 21 and recirculating delay line 24. Thus it has been determined that the second short-time spectrum derived from an input wave segment of 40 milliseconds duration is also adequately described by 320 uniformly spaced values, that is, the same number of values as the first short-time spectrum; hence if it is desired to obtain a large number of sample values, say 400 samples of each second short-time spectrum, then circuit 21 and delay line 24 may have the same delay times as specified above for circuit 11 and delay line 14, respectively.

Having specified the above delay times, the overall time required by the apparatus of FIG. 1A to determine the periodicity or aperiodicity of a single input wave segment may be determined. Circuit 11 delays each input wave segment by $2\tau_M$ seconds, or 40 milliseconds in the present example, since that is the length of each segment which is to be compressed in time before the time compressed segment is passed to delay line 14. Each time compressed segment is recirculated in delay line 14 in the $\tau_M$ seconds interval between clock pulses while analyzer 16 is deriving successive samples of the first short-time spectrum. Ignoring the relatively brief time for the various signals to pass from one element to the next, the total time required to obtain all of the desired samples of the first short-time spectrum $(2\tau_M + \tau_M) = 3\tau_M$ seconds, with the samples of the first short-time spectrum occupying the last $\tau_M$ seconds of this time interval; in terms of the present example, $3\tau_M = 60$ milliseconds, and the first short-time spectrum occupies the last 20 milliseconds of the elapsed 60 milliseconds.

In obtaining the second short-time spectrum the first short-time spectrum of $\tau_M$ seconds length is compressed in time by circuit 21, a process requiring $\tau_M$ seconds but coincident with the $\tau_M$ seconds during which the first short-time spectrum is being obtained by analyzer 16, hence no additional delay is added during the derivation of the first short-time spectrum and the time compression of the first short-time spectrum. The time compressed spectrum signal from circuit 21 is recirculated in delay line 24 during the next $\tau_M$ seconds interval between clock pulses while analyzer 26 is deriving successive samples of the second short-time spectrum. Thus the last of the samples completely specifying the second short-time spectrum appears at the output terminal of analyzer 26 at a time $\tau_M$ seconds after the first short-time spectrum has been obtained, making a total of $(3\tau_M + \tau_M) = 4\tau_M$ seconds to obtain the second short-time spectrum with the apparatus shown in FIG. 1A. Hence the total time required in the present invention to obtain 400 sample values of the second short-time spectrum from a 40 millisecond wave segment is 80 milliseconds.

APPENDIX

The determination of the number of samples to be obtained in order to specify completely each short-time spectrum derived in this invention is based upon the following considerations. It is assumed that wave segments to be analyzed have a uniform duration of $2\tau_M$ seconds, that is, each wave segment is time limited to an interval $2\tau_M$ seconds in duration. It is further assumed that the values of the first short-time spectrum to be obtained from each wave segment are values of the power spectrum, that is, heterodyne spectrum analyzer 16 in FIG. 1A obtains from the $k$th wave segment values of the $k$th power spectrum $|F_k\omega)|^2$. In order to determine the number of values required to specify each power spectrum, it is necessary to examine the time limits of the Fourier transform of each power spectrum. Since the Fourier transform of a power spectrum is the autocorrelation function of the original time function, the time limits of the Fourier transform of $|F_k(\omega)|^2$ are twice those of the original time function $f_k(t)$, that is, the Fourier transform of $|F_k(\omega)|^2$ is time limited to an interval $2 \times 2\tau_M = 4\tau_M$ seconds in duration. Hence the $k$th power spectrum is specified completely by $$\frac{f_M}{\frac{1}{4\tau_M}}$$

samples spaced apart at $1/4\tau_M$ cycles per second intervals, where $f_M$ is the band limit of the $k$th power spectrum. In the example used in the foregoing description, $F_M = 4,000$ cycles per second and $2\tau_M = 40$ milliseconds, hence each first short-time spectrum is completely specified by $$\frac{f_M}{\frac{1}{4\tau_M}} = \frac{4,000}{\frac{1}{80 \times 10^{-3}}} = 320$$

samples spaced apart at intervals of $$\frac{1}{80 \times 10^{-3}} = 12.5 \text{ cycles per second}$$

In order to determine the number of samples required to describe the second short-time spectrum $C_k(q)$ obtained in this invention, it is observed that the $k$th second short-time spectrum $C_k(q)$ may be defined as the square of the Fourier cosine transform of the logarithm of the power spectrum, as shown on page 301 of the Noll article. Alternatively, $C_k(q)$ may be defined more generally as the power spectrum of log $|F_k(<v^)|^2$, that is, $C_k(q)$ may be defined as the sum of the squares of the Fourier sine and cosine transforms of log $|F_k(\omega)|^2$, in which case the Fourier transform of $C_k(q)$ is by analogy the "autocorrelation function" of log $|F_k(\omega)|^2$. Since log $|F_k(\omega)|^2$ is an even function, it can be considered to be defined completely for frequencies of $o$ to $f_M$ and zero elsewhere. Hence in such an analogy the band limits of the Fourier transform of $C_k(q)$ are twice the band limit $f_M$ of log $|F_k(<v^)|^2$, and therefore the sampling interval for $C_k(q)$ is $1/2f_M$. In terms of the example given above, the number of samples of $C_k(q)$ is $$\frac{\tau_M}{\frac{1}{2f_M}} = \frac{40 \times 10^{-3}}{\frac{1}{2 \times 4 \times 10^3}} = 320$$

samples spaced apart at intervals of $$\frac{1}{2 \times 4 \times 10^3} = 0.125 \text{ milliseconds}$$

milliseconds.

Although this invention has been described in terms of detecting periodicity and aperiodicity in speech waves, it is to be understood that applications of this invention are not limited to speech waves but include detection of periodicity and aperiodicity in any complex wave. In addition, it is to be understood that the above-described embodiments of the principles of this invention are merely illustrative of the numerous arrangements that may be devised for the principles of this invention by those skilled in the art without departing from the spirit and scope of the invention.

We claim:

1. Apparatus for continuously determining whether a speech wave is periodic or aperiodic, which comprises:
   means supplied with a time varying speech wave for selecting therefrom successive wave segments, each of which contains at least two periods of said speech wave;
   first spectrum analyzer means supplied with said selected speech wave segments for developing short-time spectrum samples of each of said speech wave segments;
   logarithmic amplifier means supplied with said spectrum samples for developing a signal proportional to the logarithm of said samples;
   second spectrum analyzer means supplied with said logarithmic signals for developing short-time spectrum samples thereof; and
   means, responsive to said spectrum samples produced by said second analyzer means, for indicating the presence or absence of a single large peak among said samples, the presence of a single large peak designating said speech wave as periodic, and the absence of a large peak designating said speech wave as aperiodic.

2. Apparatus as defined in claim 1 wherein said means for selecting successive wave segments from said supplied time varying speech wave is adjusted to select speech wave segments which overlap one another by a predetermined amount.

3. Apparatus as defined in claim 1, in combination with means, supplied with short-time spectrum samples produced by said second analyzer, for indicating the relative location of each indicated peak on a time scale as an indication of the pitch of said supplied speech wave.

4. Apparatus for continuously determining in real time whether a relatively long speech wave is periodic or aperiodic, which comprises:
   time compressor means supplied with a time varying speech wave for compressing the time scale of said speech wave;

means for separating said compressed speech wave into segments of sufficient duration to contain at least two periods of said speech wave during periodic portions thereof;

first spectrum analyzer means supplied with said compressed speech wave segments for developing short-time spectrum samples of each of said speech wave segments;

logarithmic amplifier means supplied with said spectrum samples for developing a signal proportional to the logarithm of said samples;

second time compressor means supplied with said logarithmic signals for compressing the time scale thereof;

second spectrum analyzer means supplied with said compressed logarithmic signals for developing short-time spectrum samples thereof; and means, responsive to said spectrum samples produced by said second analyzer means, for indicating the presence of large peaks among said samples, the presence of a single large peak designating said speech wave as periodic and the absence of a single large peak designating said speech wave as aperiodic.

5. Apparatus as defined in claim 4, in combination with means, responsive to said spectrum samples produced by said second analyzer means, for indicating the relative location of each indicated large peak among said samples on a time scale as an indication of the pitch of said supplied speech wave.

6. Apparatus for determining the pitch characteristic of a speech wave characterized by periodic and aperiodic portions, which comprises:

means for dividing a supplied speech wave into successive overlapping segments, each having a predetermined length sufficient to contain at least two of the longest periods of said speech wave that are present during periodic portions thereof;

means supplied with said successive speech wave segments for deriving a succession of cepstrum signals for each corresponding succession of said overlapping segments of said speech wave, each of said cepstrum signals indicating periodicity or aperiodicity in the corresponding speech wave segment by the presence or absence of a single large peak; and peak detector means for deriving from said succession of cepstrum signals a pitch control signal indicative of the presence or absence of a single large peak in successive cepstrum signals and, if a peak is present, for indicating the relative location of said peak on a time scale as an indication of the pitch of said corresponding speech wave segment.

7. Apparatus for determining the pitch characteristic of an applied speech wave characterized by periodic portions, representing voiced sounds, and aperiodic portions, representing unvoiced sounds, which comprises:

means for dividing an applied speech wave into successive segments, each segment having a predetermined uniform length containing at least two periods of said speech wave;

first analyzer means for deriving from each of said segments a first plurality of samples representing selected values of a first short-time spectrum of said segment;

means for converting said first plurality of samples into a logarithm waveform representing the logarithm of said first short-time spectrum;

a second analyzer means supplied with said logarithm waveform for deriving therefrom a second plurality of samples representing selected values of a short-time spectrum of the logarithm of said first short-time spectrum; and means responsive to signals from said second spectrum analyzer for detecting the presence of a single large peak as an indication of a periodic segment of said applied speech wave.

8. In a vocoder communication system, apparatus for deriving a pitch control signal from an applied speech wave, which comprises:

means for dividing an applied speech wave into successive segments, each segment having a predetermined uniform length sufficient to contain at least two of the longest periods of said speech wave that are present during periodic portions thereof;

means, supplied with successive segments of said speech wave, for deriving signals representing short-time power spectra of said speech wave segments;

means for developing, from said short-time spectra signals, signal waves that represent the logarithms of said short-time power spectra;

means supplied with said logarithm signals for deriving signals representing the short-time power spectra of said logarithm signals;

means for detecting the presence of a single large peak in each of said signals representing the spectrum of one of said logarithm signals as an indication of a periodic segment of said speech wave; and means for indicating the relative location of each such detected peak on a time scale as an indication of the momentary pitch of said speech wave.